(12) United States Patent
Huang

(10) Patent No.: US 7,441,739 B2
(45) Date of Patent: Oct. 28, 2008

(54) SUPPORTING DEVICE FOR SUPPORTING AN ARTICLE THEREON

(76) Inventor: Ming-Hsien Huang, 27F-3, No. 26, Lane 28, Long-An Rd., Hsi-Chih City, Taipei Hsien (TW)

( * ) Notice: Subject to any disclaimer, the term of this patent is extended or adjusted under 35 U.S.C. 154(b) by 245 days.

(21) Appl. No.: 11/300,434

(22) Filed: Dec. 15, 2005

(65) Prior Publication Data

US 2007/0007409 A1 Jan. 11, 2007

(30) Foreign Application Priority Data

Dec. 16, 2004 (TW) .............................. 93139161 A

(51) Int. Cl.
*E04G 3/00* (2006.01)
(52) U.S. Cl. .............................. 248/292.14; 248/294.1; 248/917
(58) Field of Classification Search ............ 248/292.14, 248/294.1, 298.1, 917–923, 292.13, 214, 248/288.51, 287.1; 361/681, 683; 345/156; D8/373, 380; D14/451, 452
See application file for complete search history.

(56) References Cited

U.S. PATENT DOCUMENTS

| | | | |
|---|---|---|---|
| 6,559,829 B1 * | 5/2003 | Matsuo et al. .............. 345/156 |
| 6,905,101 B1 * | 6/2005 | Dittmer .................... 248/274.1 |
| 6,923,413 B2 * | 8/2005 | Dozier ..................... 248/294.1 |
| 7,070,156 B2 * | 7/2006 | Liao .......................... 248/917 |
| D528,901 S * | 9/2006 | David ......................... D8/373 |
| 7,152,836 B2 * | 12/2006 | Pfister et al. ........... 248/292.14 |
| 7,178,775 B2 * | 2/2007 | Pfister et al. ........... 248/292.14 |
| D538,140 S * | 3/2007 | Ly Hau et al. ............... D8/373 |
| 2006/0065800 A1 * | 3/2006 | Bremmon ................ 248/274.1 |

* cited by examiner

*Primary Examiner*—Amy J. Sterling
*Assistant Examiner*—Tan Le
(74) *Attorney, Agent, or Firm*—Pillsbury Winthrop Shaw Pittman LLP

(57) ABSTRACT

A supporting device includes: a first part that is formed with upper and lower retaining grooves; a second part that is formed with an upper hook extending into the upper retaining groove in such a manner that the second part is pivotable relative to the first part between first and second positions, the second part being further formed with a lower hook that is disposed in the lower retaining groove when the second part is disposed at the first position, and that is disposed outwardly of the lower retaining groove when the second part is disposed at the second position; and a locking member mounted movably in the lower retaining groove and engageable releasably with the lower hook when the lower hook is disposed in the lower retaining groove.

2 Claims, 5 Drawing Sheets

SUPPORTING DEVICE FOR SUPPORTING AN ARTICLE THEREON

CROSS-REFERENCE TO RELATED APPLICATION

This application claims priority of Taiwanese application no. 093139161, filed on Dec. 16, 2004.

BACKGROUND OF THE INVENTION

1. Field of the Invention

This invention relates to a supporting device for supporting an article thereon, more particularly to a supporting device having a first part formed with upper and lower retaining grooves, and a second part formed with upper and lower hooks that are respectively engageable with the upper and lower retaining grooves.

2. Description of the Related Art

Conventionally, a display device is supported on a supporting device, such as a stand or a frame, such that the display device is firmly held on the supporting device and cannot rotate relative to the supporting device. However, in some occasions, the display device is required to be tilted to a certain angle relative to the supporting device so that connection or disconnection between a cable line and a connector on the display device can be easily performed.

SUMMARY OF THE INVENTION

Therefore, the object of the present invention is to provide a supporting device that is capable of overcoming the aforesaid drawback of the prior art.

According the present invention, there is provided a supporting device that comprises: a first part that is formed with upper and lower retaining grooves; a second part that is adapted to support the article and that is formed with an upper hook extending into the upper retaining groove in such a manner that the second part is pivotable relative to the first part between first and second positions, the second part being further formed with a lower hook that is disposed in the lower retaining groove when the second part is disposed at the first position, and that is disposed outwardly of the lower retaining groove when the second part is disposed at the second position; and a locking member mounted movably in the lower retaining groove and engageable releasably with the lower hook when the lower hook is disposed in the lower retaining groove, thereby retaining the second part at the first position.

BRIEF DESCRIPTION OF THE DRAWINGS

In drawings which illustrate embodiments of the invention.

DETAILED DESCRIPTION OF THE PREFERRED EMBODIMENTS

Figure 1:
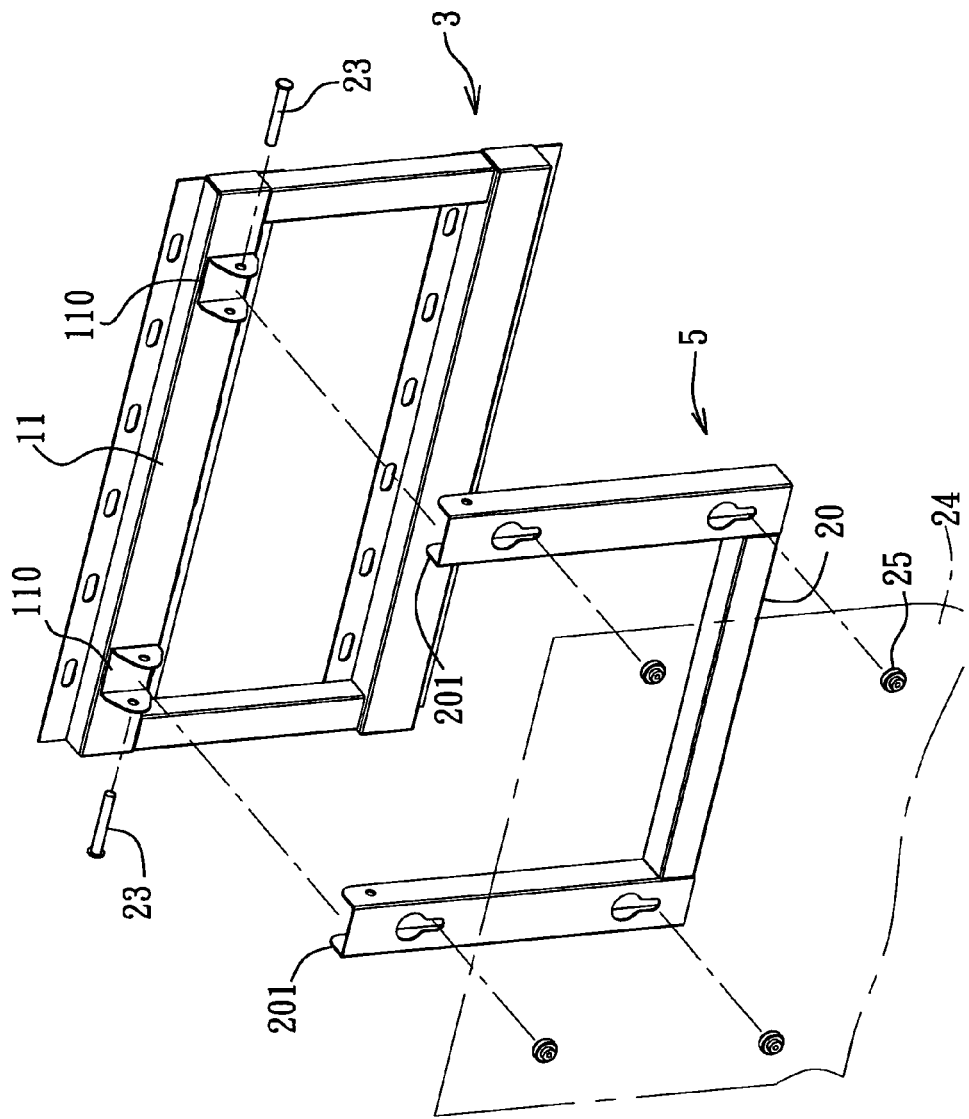
FIG. 1 is an exploded perspective view of the first preferred embodiment of a supporting device according to this invention.

Before the present invention is described in greater detail with reference to the accompanying preferred embodiments, it should be noted herein that like elements are denoted by the same reference numerals throughout the disclosure.

FIG. 1 illustrates the first preferred embodiment of a supporting device according to the present invention for supporting an article 24, such as a display, thereon.

The supporting device of this embodiment includes a first part 3 adapted to be fixed to a wall (not shown), and a second part 5 pivoted to the first part 3 and adapted to support the article 24 through protrusions 25 which protrude from the article 24. The first part 3 includes a generally rectangular frame 11 that is formed with a pair of pivot protrusions 110. The second part 5 includes a U-shaped frame 20 that has two opposite ends 201 which are respectively pivoted to the pivot protrusions 110 through a pair of pivot pins 23 so as to permit pivoting movement of the second part 5 together with the article 24 relative to the first part 3.

Figure 2:
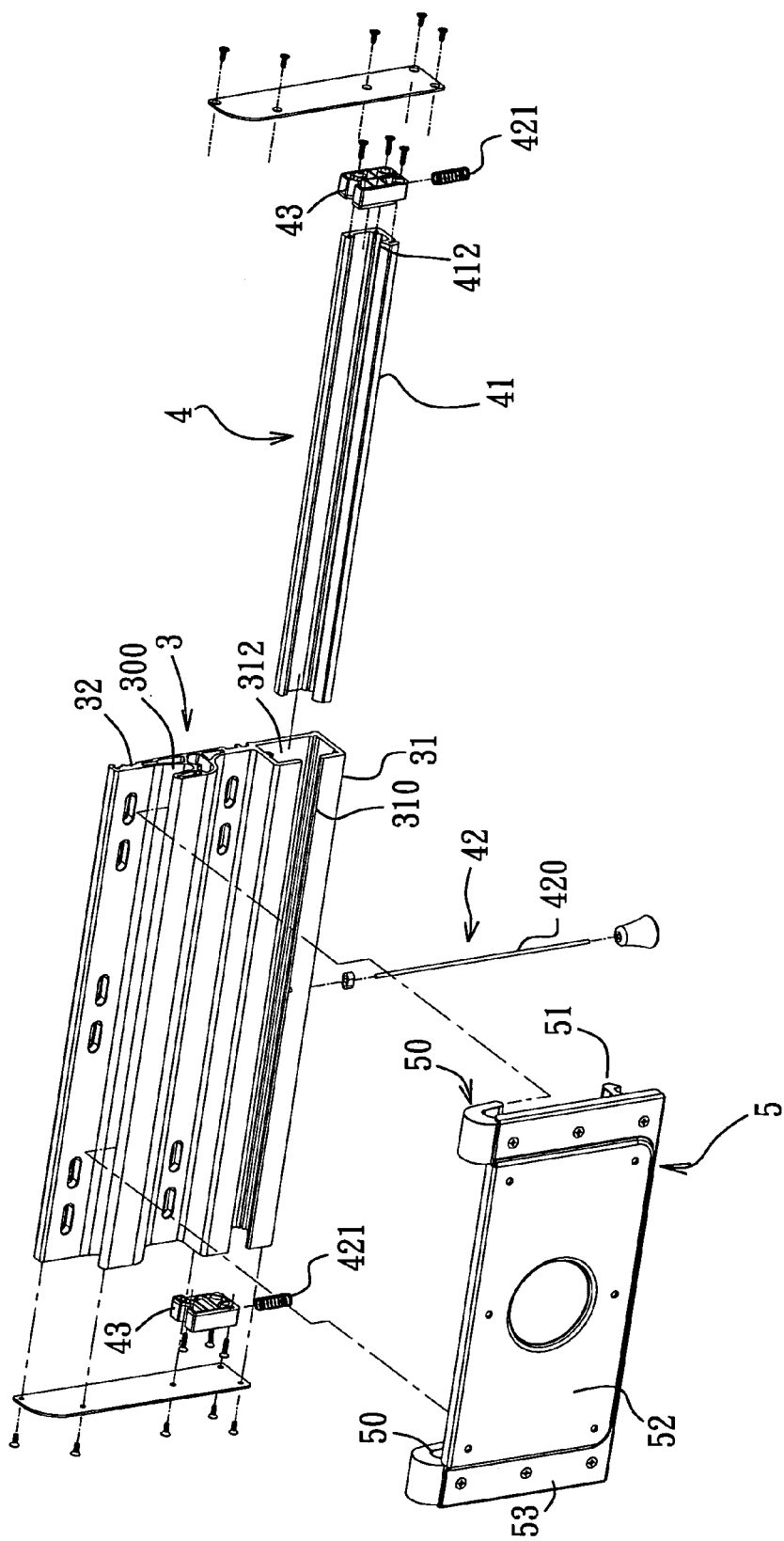
FIG. 2 is an exploded perspective view of the second preferred embodiment of the supporting device according to this invention.
Figure 3:
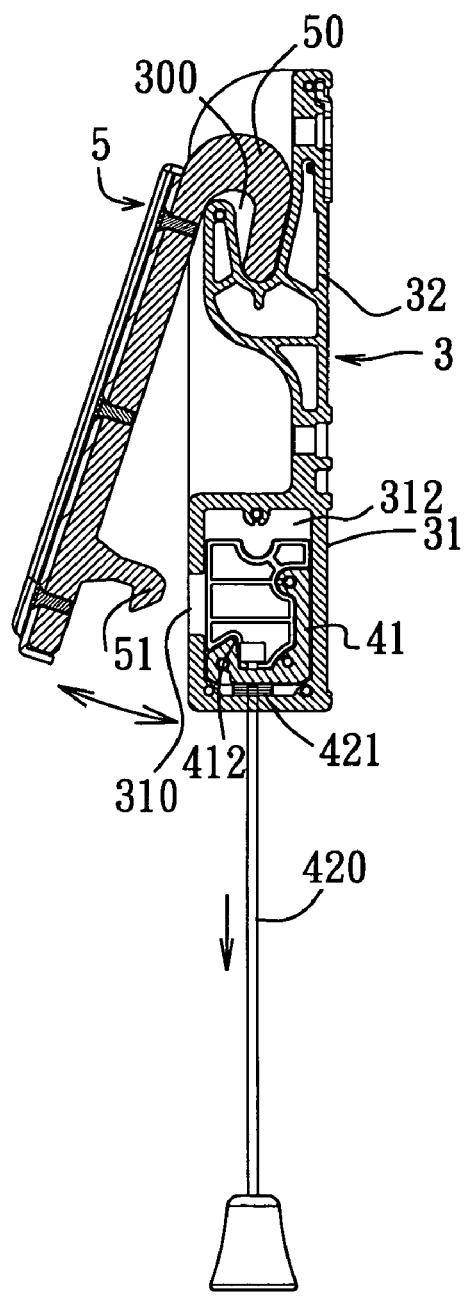
FIG. 3 is an assembled sectional view illustrating a state where a lower hook of the second preferred embodiment is disposed outwardly of a lower retaining groove.
Figure 4:
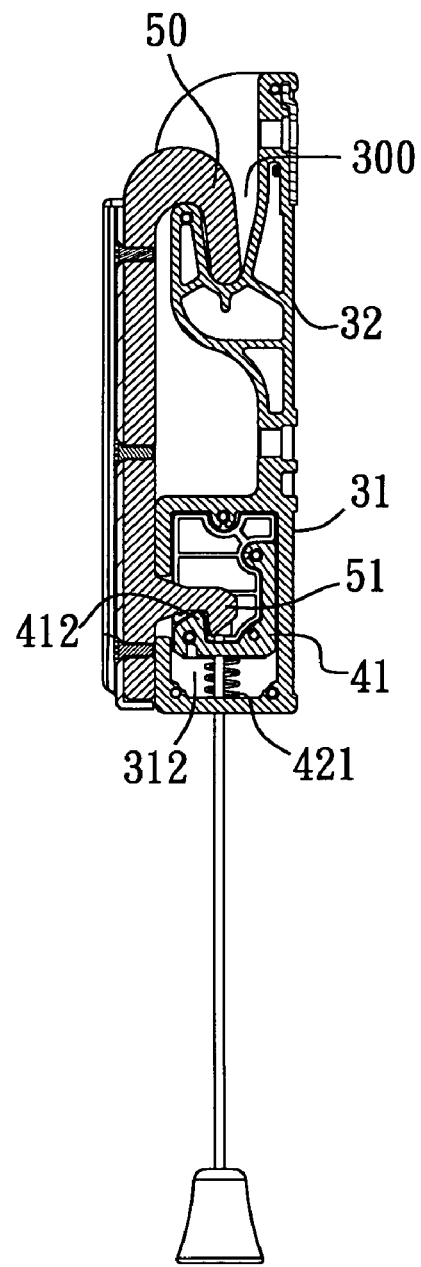
FIG. 4 is an assembled sectional view illustrating another state where the lower hook of the second preferred embodiment is disposed in the lower retaining groove.

FIGS. 2 to 4 illustrate the second preferred embodiment of the supporting device according to this invention.

The supporting device of this embodiment includes: a first part 3 that is formed with upper and lower retaining grooves 300, 312; a second part 5 that is adapted to support the article (not shown) and that is formed with a pair of upper hooks 50 extending into the upper retaining groove 300 in such a manner that the second part 5 is pivotable relative to the first part 3 between first and second positions, the second part 5 being further formed with a pair of lower hooks 51 that are disposed in the lower retaining groove 312 when the second part 3 is disposed at the first position (see FIG. 4), and that are disposed outwardly of the lower retaining groove 312 when the second part 5 is disposed at the second position (see FIG. 3); and a locking member 4 mounted movably in the lower retaining groove 312 and engageable releasably with the lower hooks 51 when the lower hooks 51 are disposed in the lower retaining groove 312, thereby retaining the second part 5 at the first position.

In this embodiment, the locking member 4 includes a generally L-shaped plate 41 having a hook end 412 and movable between an upper position (see FIG. 4), in which the hook end 412 engages the lower hooks 51 when the second part 5 is disposed at the first position, and a lower position (see FIG. 3), in which the hook end 412 disengages the lower hooks 51.

The locking member 4 further includes a pair of urging members 421 mounted in the lower retaining groove 312 underneath the L-shaped plate 41 for urging the L-shaped plate 41 to the upper position. An operating member 42 includes a thin rod 420 connected to the L-shaped plate 41, and is operable to move the L-shaped plate 41 against urging action of the urging members 421 from the upper position to the lower position. A pair of protective sleeves 43 are sleeved on two ends of the L-shaped plate 41.

The first part 3 includes a first portion 31 that has a generally C-shaped cross-section and that defines the lower retaining groove 312, and a second portion 32 that has a generally J-shaped cross-section and that defines the upper retaining groove 300. The second part 5 includes a central plate body 52 and a U-shaped frame body 53 around the central plate body 52 and integrally connected to the central plate body 52. The upper and lower hooks 50, 51 are formed on the U-shaped frame body 53. The central plate body 52 is adapted to be connected to the article (not shown).

Figure 5:
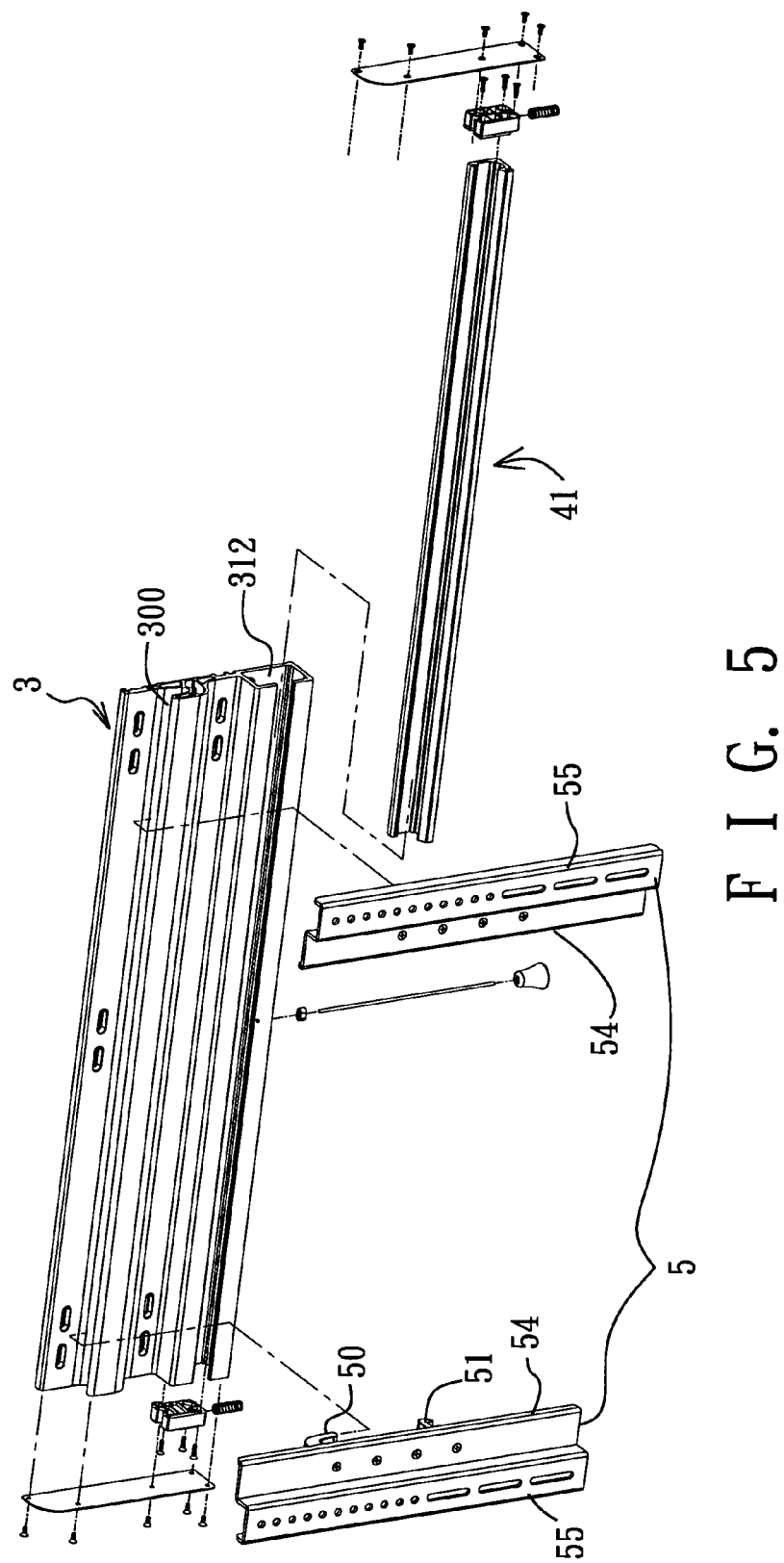
FIG. 5 is an exploded perspective view of the third preferred embodiment of the supporting device according to this invention.
Figures 6, 7:
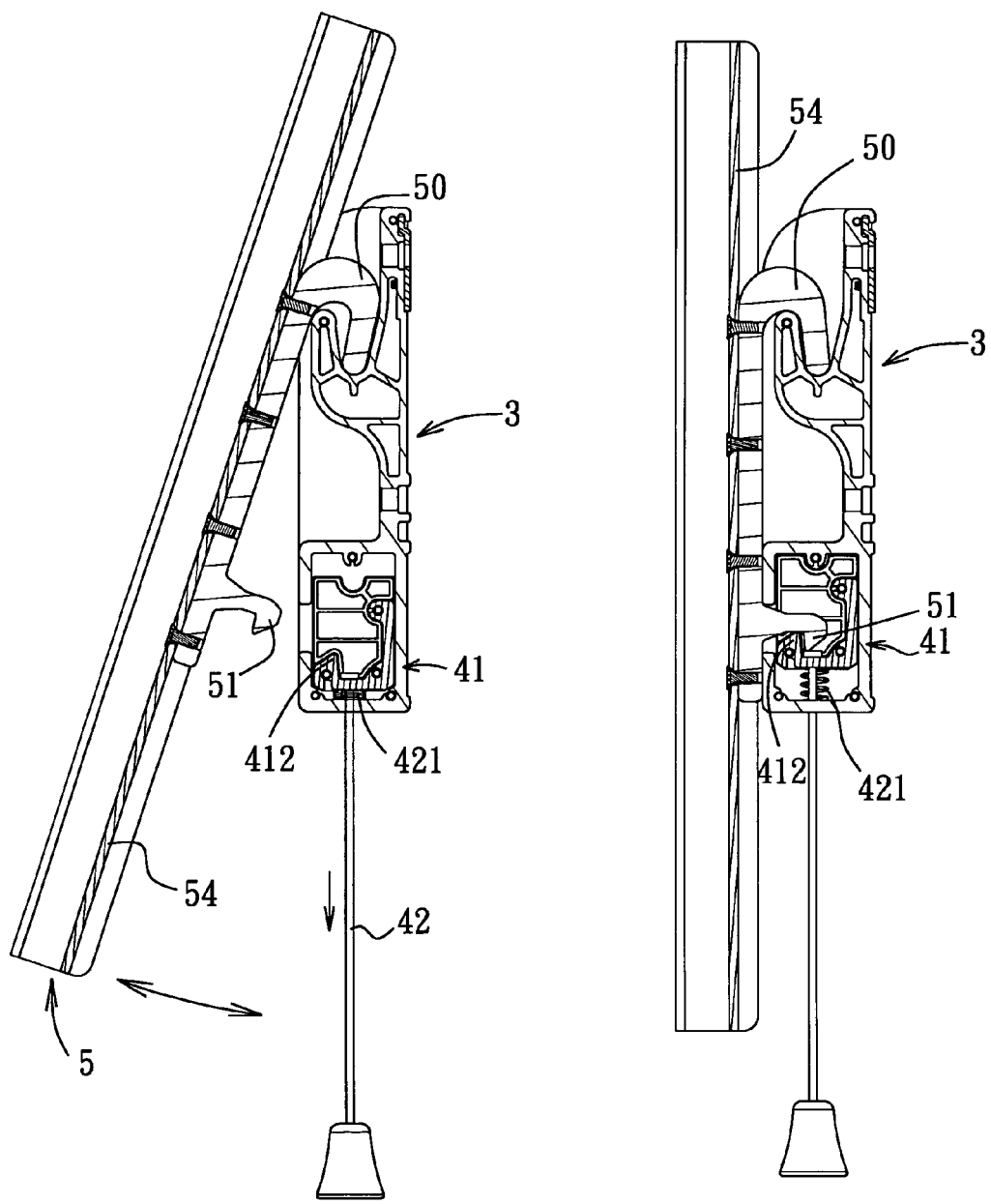
FIG. 6 is an assembled sectional view illustrating a state where a lower hook of the third preferred embodiment is disposed outwardly of a lower retaining groove.
FIG. 7 is an assembled sectional view illustrating another state where the lower hook of the third preferred embodiment is disposed in the lower retaining groove.

FIGS. 5 to 7 illustrate the third preferred embodiment of the supporting device according to this invention. The supporting device of this embodiment differs from the second preferred embodiment in that the second part 5 includes a pair of separate vertical plates, each of which has a generally Z-shaped cross-section and each of which has a first portion 54, a second portion 55 parallel to the first portion 54, and an intermediate portion that interconnects an adjacent pair of ends of the first and second portions 54, 55. The upper and lower hooks 50, 51 are formed on the first portions 54 of the vertical plates of the second part 5. The second portions 55 of the vertical plates of the second part 5 are adapted to be connected to the article (not shown).

With the inclusion of the upper and lower retaining grooves 300, 312 and the upper and lower hooks 50, 51 in the supporting device of this invention, the aforesaid drawback associated with the prior art can be eliminated.

With the invention thus explained, it is apparent that various modifications and variations can be made without departing from the spirit of the present invention.

What is claimed is:

1. A supporting device for supporting an article thereon, comprising:

a first part that is formed with upper and lower retaining grooves;

a second part that is adapted to support the article and that is formed with an upper hook extending into said upper retaining groove in such a manner that said second part is pivotable relative to said first part between first and second positions, said second part being further formed with a lower hook that is disposed in said lower retaining groove when said second part is disposed at said first position, and that is disposed outwardly of said lower retaining groove when said second part is disposed at said second position; and a locking member mounted movably in said lower retaining groove and engageable releasably with said lower hook when said lower hook is disposed in said lower retaining groove, thereby retaining said second part at said first position, wherein said locking member includes a generally L-shaped plate having a hook end and movable between an upper position, in which said hook end engages said lower hook when said second part is disposed at said first position, and a lower position, in which said hook end disengages said lower hook, and wherein said locking member further includes a pair of urging members mounted in said lower retaining groove underneath said L-shaped plate for urging said L-shaped plate to said upper position.

2. The supporting device of claim 1, further comprising an operating member that is connected to said L-shaped plate and that is operable to move said L-shaped plate against urging action of said urging members from said upper position to said lower position.

* * * * *